(12) United States Patent
Herman et al.

(10) Patent No.: US 10,467,887 B2
(45) Date of Patent: Nov. 5, 2019

(54) SYSTEMS AND METHODS OF INTEGRATING SENSOR OUTPUT OF A MOBILE DEVICE WITH A SECURITY SYSTEM

(71) Applicant: Google LLC, Mountain View, CA (US)

(72) Inventors: Kenneth Louis Herman, San Jose, CA (US); Bryan James, Menlo Park, CA (US); Keith Kops, Pleasanton, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/009,516

(22) Filed: Jun. 15, 2018

(65) Prior Publication Data

US 2018/0293876 A1 Oct. 11, 2018

Related U.S. Application Data

(63) Continuation of application No. 14/719,859, filed on May 22, 2015, now abandoned.

(51) Int. Cl.
*G08B 25/01* (2006.01)
*H04W 4/021* (2018.01)
(Continued)

(52) U.S. Cl.
CPC ......... *G08B 25/016* (2013.01); *G08B 25/008* (2013.01); *G08B 25/14* (2013.01);
(Continued)

(58) Field of Classification Search
CPC combination set(s) only.
See application file for complete search history.

(56) References Cited

U.S. PATENT DOCUMENTS 5,568,535 A 10/1996 Sheffer et al.
5,736,927 A 4/1998 Stebbins et al.
(Continued)

FOREIGN PATENT DOCUMENTS

CN 2790064 Y 6/2006
DE 10150745 A1 4/2003
(Continued)

OTHER PUBLICATIONS

Bo Cheng et al., 'Continuous user identification via touch and movement behavioral biometrics,' 2014 IEEE 33rd Int'l Performance Computing & Communications Conference (IPCCC). IEEE, Dec. 5, 2014, pp. 1-8, XP032725861.
(Continued)

*Primary Examiner* — Thomas S McCormack
(74) *Attorney, Agent, or Firm* — Morris & Kamlay LLP

(57) ABSTRACT

Systems and methods of operating an alarm device of a home security system which integrates one or more sensors of a mobile device when the mobile device is located within a home protected by the home security system are provided. The security system may determine an unauthorized entry to the home based on an operating mode of the home security system and sensor data collected by the one or more sensors of the mobile device. An alarm may be output by the alarm device of the home security system based on the determined unauthorized entry by the home security system.

17 Claims, 5 Drawing Sheets

(51) Int. Cl.
*G08B 25/00* (2006.01)
*G08B 25/14* (2006.01)
*H04W 4/33* (2018.01)
*H04W 4/04* (2009.01)

(52) U.S. Cl.
CPC ........... *H04W 4/021* (2013.01); *H04W 4/043* (2013.01); *H04W 4/33* (2018.02)

(56) References Cited

U.S. PATENT DOCUMENTS

| | | | |
|---|---|---|---|
| 2009/0219156 A1 | 9/2009 | August | |
| 2010/0289644 A1 | 11/2010 | Slavin | |
| 2011/0169637 A1* | 7/2011 | Siegler, II | G08B 13/2494 340/541 |
| 2013/0183924 A1* | 7/2013 | Saigh | H04W 4/029 455/404.2 |
| 2016/0150338 A1* | 5/2016 | Kim | G08B 1/08 381/58 |
| 2017/0076584 A1* | 3/2017 | Eskildsen | G08B 25/016 |

FOREIGN PATENT DOCUMENTS

| | | | |
|---|---|---|---|
| EP | 1912180 | A2 | 4/2008 |
| EP | 2348448 | A1 | 7/2011 |
| EP | 2683146 | A1 | 1/2014 |
| EP | 2698288 | A1 | 2/2014 |
| WO | 2013043393 | A1 | 3/2013 |
| WO | 2014072910 | A1 | 5/2014 |
| WO | 2015047739 | A1 | 4/2015 |

OTHER PUBLICATIONS

Kumar Shiu et al, 'Android based smart home system with control via Bluetooth and internet connectivity,' 18th IEEE Int'l Symposium on Consumer Electronics (ISCE 2014), IEEE, Jun. 22, 2014, pp. 1-2, XP032630965.

Hansheng Lei et al, 'Special Sound Detection for emergency phones,' 2013 IOTH Int'l Conference on Fuzzy Systems and Knowledge Discovery (FSKD). IEEE, Jul. 23, 2013, pp. 816-820, XP032596339.

Elsa Macias et al, 'Mobile sensing systems,' Sensors (Basel, Switzerland), Dec. 16, 2013, pp. 17292-17321, XP055134543, Retrieved from the Internet: URL:http://www.ncbi.nlm.nih.gov/pubmed/24351637 [retrieved on Aug. 13, 2014].

Alshei KH Mohammad Abu et al. 'Machine Learning in Wireless Sensor Networks: Algorithms, Strategies, and Applications,' IEEE Communications Surveys & Tutorials, vol. 16, No. 4, Apr. 24-Nov. 18, 2014, pp. 1996-2018, XP011565128.

Seki H, 'Fuzzy inference based non-daily behavior pattern detection for elderly people monitoring system,' Proceedings of 31st Annual Int'l Conf. of IEEE Engineering in Medicine and Biology Society: Engineering the Future of Biomedicine, EMBC 2009, IEEE, Sep. 3, 2009, pp. 6187-6192, XP031882452.

International Search Report and Written Opinion in PCT/US2016/033341 dated Jul. 29, 2016.

* cited by examiner

SYSTEMS AND METHODS OF INTEGRATING SENSOR OUTPUT OF A MOBILE DEVICE WITH A SECURITY SYSTEM

FIELD OF INVENTION

This application relates to operating an alarm device of a home security system, and, in particular, outputting an alarm by the alarm device when the security system determines an unauthorized entry to a home protected by the home security system based on an operating mode of the home security system and sensor data collected by one or more sensors of a mobile device that is located within the home and is integrated with the home security system.

BACKGROUND

An increasing number of home and building security systems have sensors to detect a security event. These sensors of the home or building security systems can be of different types. However, increasing the number and type of sensors in a security system can substantially increase the costs of the security system to users.

Mobile device usage, including smartphones, has increased. Present mobile devices can include one or more sensors, such as accelerometers. Although users of mobile devices can access and use a variety of applications from the mobile device, present home and building security systems do not integrate the functionality and sensors of mobile devices into the security system.

BRIEF SUMMARY

Implementations of the disclosed subject matter integrate sensors of a mobile device with a security system when the mobile device is within a predetermined range of the security system. That is, the data collected by the sensors of the mobile device may be provided to the security system, and may be used to determine a security event and/or to verify data collected by other sensors of the security system. When the mobile device is within the predetermined range, the operating mode of the security system may determine whether the device is integrated into the security system.

The implementations of the disclosed subject matter allow for mobile devices that a user may already have participate in a security system of the home or building that the user and/or mobile devices are in. The implementations of the security system of the disclosed subject matter may secure the mobile devices themselves, as movement of the mobile devices may be treated as a security event by the security system. That is, the data collected by the sensors of the mobile device enhance the security of the home or building, as well as that of the mobile device itself.

According to an implementation of the disclosed subject matter, a method is provided that includes determining an operating mode of a security system, determining whether a mobile device is located within a predetermined range of the security system, and receiving, by the security system, sensor data collected by the mobile according to the determined operating mode of the security system and the determined location of the mobile device.

According to an implementation of the disclosed subject matter, a security system is provided that includes a processor to determine an operating mode of the security system and to determine whether a mobile device is located within a predetermined range of the security system, and a communications interface to receive sensor data collected by the mobile device according to the operating mode of the security system and the determined location of the mobile device.

According to an embodiment of the disclosed subject matter, means for integrating data captured by one or more sensors of a mobile device with a security system are provided that include determining an operating mode of a security system, determining whether a mobile device is located within a predetermined range of the security system, and transmitting sensor data collected by the mobile device to the security system according to the operating mode of the security system and the determined location of the mobile device.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
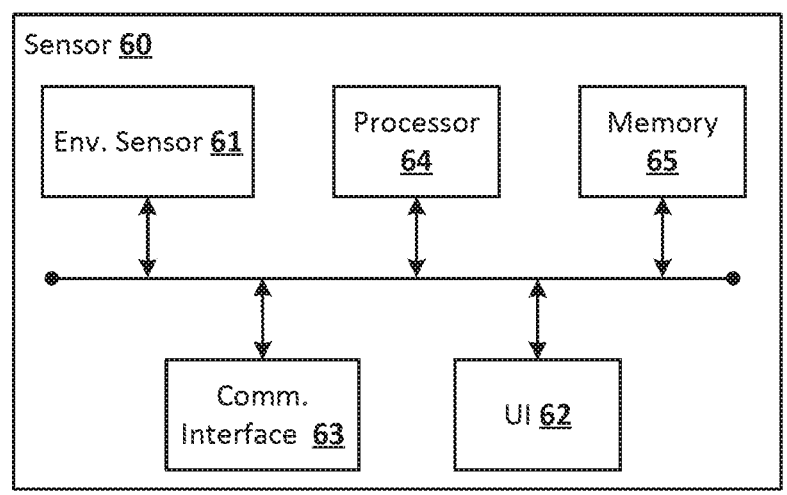
FIG. 1 shows an example sensor according to an implementation of the disclosed subject matter.

Implementations of the disclosed subject matter provide a security system that integrates one or more sensors of a mobile device with the security system. This integration may occur when the mobile device is within a predetermined range of the security system. That is, the data collected by the sensors of the mobile device may be provided to the security system, and may be used to determine a security event and/or to verify data collected by other sensors of the security system.

One or more sensors of the mobile device may be integrated with the security system to increase the number and/or type of sensors of the security system. For example, increasing the number of fixed sensors within a home or building may increase costs. However, by integrating the sensors of the mobile device with a security system, the number of sensors to the security system can be increased, and the sensors may determine security events and/or verify the data collected by other sensors within the security system.

Although integrating the mobile device with the security system may increase the number of sensors of the system, the operating mode of the security system may determine whether to integrate the mobile device. That is, the operating mode of the security system may determine whether a mobile device that is located within the predetermined range of the security system is integrated with the security system.

The sensors of the mobile device may operate independent from the security system according to the mode of the security system. For example, when the security system is operating in a mode (e.g., a home mode, as discussed below) where users are active within the building and sensors of the security system may be directed to monitoring activity occurring on the outside of the building, the mobile device may be configured and/or controlled such that the sensors of the mobile device are not integrated with the security system. That is, when the mobile device is inside of the building, the sensors of the mobile device may not be integrated with the security system, as the mode of the security system may be directed to monitoring activity outside of the building.

The sensors of the mobile device may be integrated with the security system according to the mode of the security system. For example, when the user has left the mobile device in the building, either intentionally or accidentally, and the operating mode of the security system of the building is set to an away mode or a vacation mode (as described in detail below), the sensors of the mobile device may be integrated with the security system so as to detect a security event. The security event may include, for example, the movement of the mobile device by an unauthorized person.

When the mobile device and the sensors therein are outside of the range of the security system, the data collected by the sensors is not typically useful for determining a security event related to the building having the security system. However, the data acquired by the sensors of the mobile device may be used for the security of the mobile device itself (e.g., tracking the mobile device when the mobile device is taken by an unauthorized person).

That is, in implementations of the disclosed subject matter, the sensors of the mobile device may be integrated with the security system in order to monitor activities and determine whether a security event has occurred (including an event which involves the mobile device itself) when the mobile device is within a predetermined range of the security system and according to the operating mode of the security system.

Sensor data collected by sensors of the mobile device may be transmitted when the operating mode of the security system is determined to be one of a home mode (e.g., where one or more users are actively moving about the home, building and/or predetermined area), a stay mode (e.g., where one or more users are within the home, building and/or predetermined area, but are not actively moving), an away mode (e.g., when the one or more users are outside of the home, building and/or predetermined area), a vacation mode (e.g., when the one or more users are outside of the home, building and/or predetermined area for at least a preset length of time), a transition mode (e.g., an operating mode between the home mode and the away mode so as to allow the one or more users to exit the home, building and/or predetermined area), or the like. When the security system and the mobile device are integrated, they may operate in the same mode of operation. When the mobile device is outside of the predetermined range, the mobile device may operate in a different mode than the security system.

In some implementations, when the mobile device is within the predetermined range of the security system and is integrated with the security system that is in the away mode, vacation mode, or the transition mode, the data captured by the sensors of the mobile device may be provided to the security system to determine whether there is a security event. When the security system is in the home mode, the data captured by the sensors of the mobile device may not be provided to the security system. In some implementations, the mobile device may be configured to provide and/or selectively provide captured data from one or more particular sensors (e.g., an accelerometer, a light sensor, a microphone, and the like). Alternatively, the mobile device may be configured to provide captured data from all of the sensors to the mobile device when the mobile device is within a predetermined range of the security system and the operating mode is the home mode. In some embodiments, data captured by selected sensors of the mobile device (e.g., a light sensor, a microphone, or the like) may be provided to the security system when the mobile device is within the predetermined range of the security system and where the security system is operating in a home mode.

The integration of the mobile device and the security system may occur when the predetermined range is inside a building, within a predetermined perimeter surrounding a building, and within a predetermined geofence area. When the mobile device is within the predetermined range, the mobile device may be identified by the security system by transmitting identifying information from the mobile device to the security system via a communications link. The identification information may include one or more of, for example, a name, username, security code, an identification code, or the like.

The security system may activate an alarm when the security system determines that the mobile device has moved according to the transmitted sensor data and according to the determined operating mode. That is, when the mobile device and the security system are integrated (e.g., the mobile device is within the predetermined range) and operating in the same mode (e.g., an away mode), data captured by the sensors of the mobile device may be provided to the security system to determine whether a security event has occurred. The security system may receive the date from the sensors of the mobile device, determine that the mobile device is being moved (e.g., by an unauthorized person), and may activate an alarm and/or transmit a notification.

The mobile device may communicate with one or more sensors of the security system. The sensor data collected by the mobile device may be transmitted to the one or more sensors of the security system and/or to a controller of the security system. The security system may verify the data collected by one or more sensors of the security system according to the transmitted sensor data collected by the mobile device.

A security event may be determined by the security system according to the sensor data collected by the mobile device, and/or data collected by one or more sensors of the security system, and the like.

The systems and methods disclosed herein may provide for calibrating one or more sensors of the mobile device so as to a determine signature of one or more security events, and transmitting a notification to the security system from the mobile device when the one or more sensors of the mobile device determines the signature of the one or more security events.

Implementations disclosed herein may use one or more sensors. In general, a "sensor" may refer to any device that can obtain information about its environment. Sensors may be described by the type of information they collect. For example, sensor types as disclosed herein may include motion, smoke, carbon monoxide, proximity, temperature, time, physical orientation, acceleration, location, and the like. A sensor can include, for example, a camera, a retinal camera, and/or a microphone.

A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart home environment as disclosed herein. For example, a sensor may operate as a security sensor when it is used to determine security events such as unauthorized entry. A sensor may operate with different functions at different times, such as where a motion sensor is used to control lighting in a smart home environment when an authorized user is present, and is used to alert to unauthorized or unexpected movement when no authorized user is present, or when an alarm system is operating in an away mode, or the like. In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of a home security system or a smart home environment, or as otherwise directed by such a system.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the implementations disclosed herein.

A sensor may include hardware in addition to the specific physical sensor that obtains information about the environment. FIG. 1 shows an example sensor as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a Wi-Fi or other wireless interface, Ethernet or other local network interface, or the like may allow for communication by the sensor 60 with other devices.

A user interface (UI) 62 may provide information (e.g., via a display device or the like) and/or receive input from a user of the sensor. The UI 62 may include, for example, a speaker to output an audible alarm and/or message when an event is detected by the sensor 60. The speaker may output a message to an authorized user regarding the operational status (e.g., there are no security and/or environmental events, an operational issue has been detected, and/or a security event and/or environmental event has been detected) of the security system disclosed herein, when, for example, the user arrives at the building (e.g., the user's home, the user's office, or the like), or when the user exits the building. The speaker may output an audible message for a user to access information regarding the operational status of the security system, for example, when the user arrives at the building (e.g., a home, an office, or the like) via an application installed and/or accessible from an mobile device and/or electronic device (e.g., mobile device 75 illustrated in FIG. 2B and FIG. 5). Alternatively, or in addition, the UI 62 may include a light to be activated when an event is detected by the sensor 60. The user interface may be relatively minimal, such as a limited-output display, or it may be a full-featured interface such as a touchscreen.

Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

Sensors as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

Figure 2A:
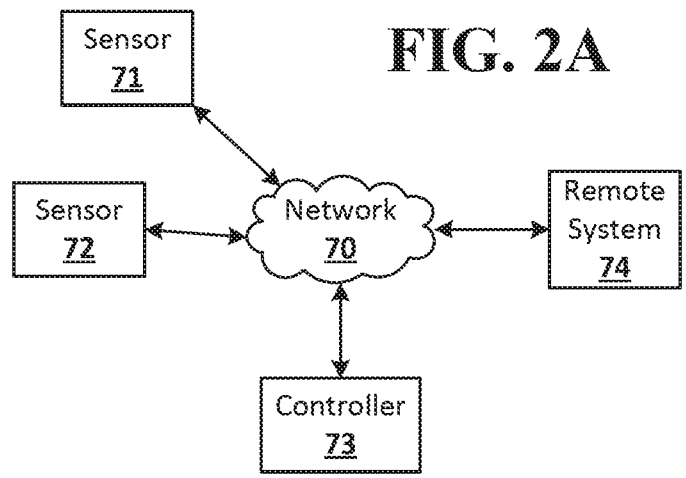
FIGS. 2A-2B show a security system according to implementations of the disclosed subject matter.
Figure 2B:
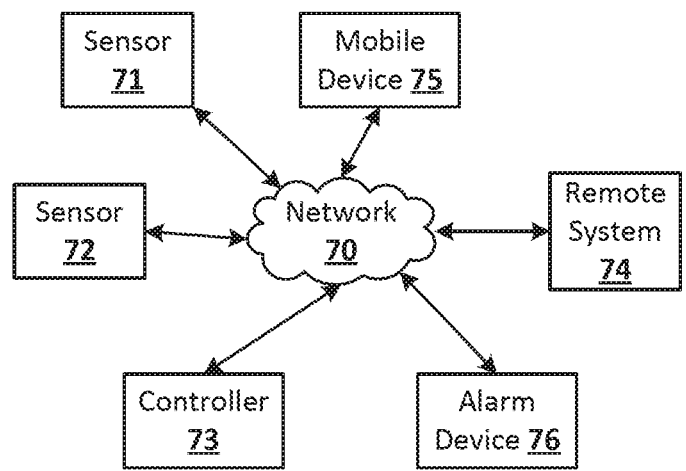
Figure 4:
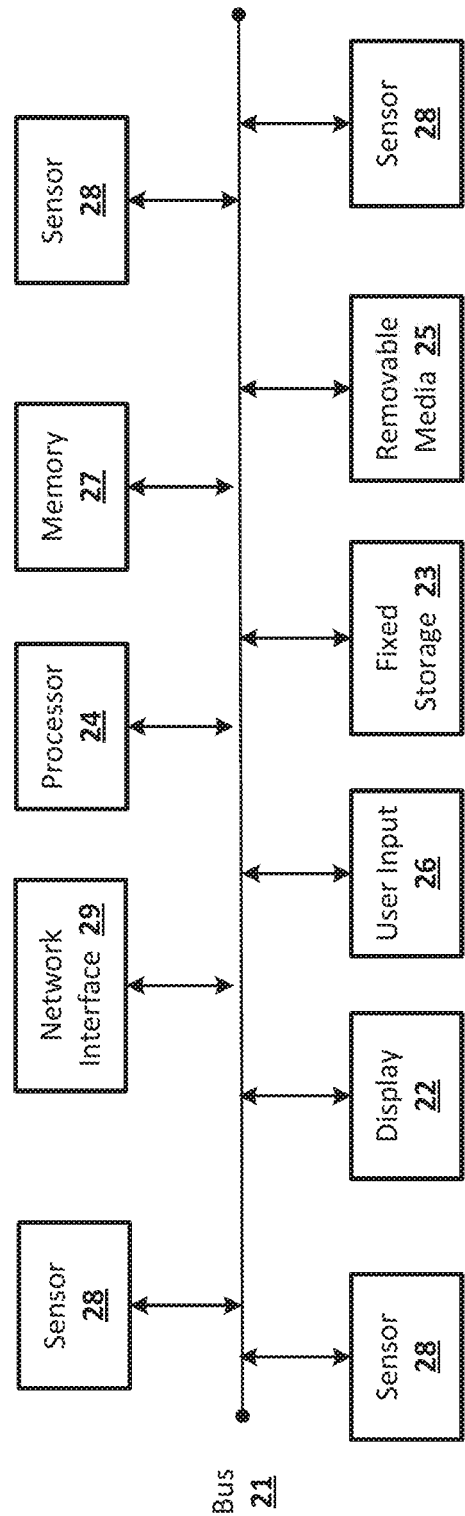
FIG. 4 shows a mobile device according to implementations of the disclosed subject matter.

FIGS. 2A-2B show examples of a security system as disclosed herein, which may be implemented over any suitable wired and/or wireless communication networks. One or more sensors 71, 72 may communicate via a local network 70, such as a Wi-Fi or other suitable network, with each other and/or with a controller 73. A mobile device 75 may have one or more sensors 28 (as shown in FIG. 4 and discussed below), and may communicate with the controller 73 and/or the sensors 71, 72 via the local network 70.

FIGS. 2A-2B show examples of a security system and/or smart-home environment as disclosed herein, which may be implemented over any suitable wired and/or wireless communication networks. One or more sensors 71, 72 may communicate via a local network 70, such as a Wi-Fi or other suitable network, with each other and/or with a controller 73. One or more of the sensors 28 of the mobile device 75, may communicate via a local network 70 with the controller 73 and/or the one or more sensors 71, 72. The devices of the security system and smart-home environment of the disclosed subject matter, which may include the one or more sensors 28 of the mobile device 75, may be communicatively connected via the network 70, which may be a mesh-type network such as Thread, which provides network architecture and/or protocols for devices to communicate with one another. Typical home networks may have a single device point of communications. Such networks may be prone to failure, such that devices of the network cannot communicate with one another when the single device point does not operate normally. The mesh-type network of Thread, which may be used in the security system of the disclosed subject matter, may avoid communication using a single device. That is, in the mesh-type network, such as network 70, there is no single point of communication that may fail so as to prohibit devices coupled to the network from communicating with one another.

The communication and network protocols used by the devices communicatively coupled to the network 70 may provide secure communications, minimize the amount of power used (i.e., be power efficient), and support a wide variety of devices and/or products in a home, such as appliances, access control, climate control, energy management, lighting, safety, and security (e.g., security of the home, security of the mobile device, and the like). For example, the protocols supported by the network and the devices connected thereto may have an open protocol which may carry IPv6 natively.

The Thread network, such as network 70, may be easy to set up and secure to use. The network 70 may use an authentication scheme, AES (Advanced Encryption Standard) encryption, or the like to reduce and/or minimize security holes that exist in other wireless protocols. The Thread network may be scalable to connect devices (e.g., 2, 5, 10, 20, 50, 100, 150, 200, or more devices) into a single network supporting multiple hops (e.g., so as to provide communications between devices when one or more nodes of the network is not operating normally). The network 70, which may be a Thread network, may provide security at the network and application layers. One or more devices communicatively coupled to the network 70 (e.g., controller 73, remote system 74, mobile device 75, and the like) may store product install codes to ensure only authorized devices can join the network 70. One or more operations and communications of network 70 may use cryptography, such as public-key cryptography.

The devices communicatively coupled to the network 70 of the smart-home environment and/or security system disclosed herein may low power consumption and/or reduced power consumption. That is, devices efficiently communicate to with one another and operate to provide functionality to the user, where the devices may have reduced battery size and increased battery lifetimes over conventional devices. The devices may include sleep modes to increase battery life and reduce power requirements. For example, communications between devices coupled to the network 70 may use the power-efficient IEEE 802.15.4 MAC/PHY protocol. In implementations of the disclosed subject matter, short messaging between devices on the network 70 may conserve bandwidth and power. The routing protocol of the network 70 may reduce network overhead and latency. The communication interfaces of the devices coupled to the smart-home environment may include wireless system-on-chips to support the low-power, secure, stable, and/or scalable communications network 70.

The controller 73 shown in FIGS. 2A-2B that is communicatively coupled to the network 70 may be and/or include a processor. Alternatively, or in addition, the controller 73 may be a general- or special-purpose computer. The controller 73 may, for example, receive, aggregate, and/or analyze environmental information received from the sensors 71, 72, and/or one or more sensors 28 of the mobile device 75. The sensors 28 and/or 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors 71, 72 and/or sensors 28 of the mobile device 75 may communicate directly with a remote system 74. The remote system 74 may, for example, aggregate data from multiple locations, provide instruction, software updates, and/or aggregated data to a controller 73 and/or sensors 71, 72 and/or sensors 28 of the mobile device 75.

The sensor network shown in FIGS. 2A-2B may be an example of a smart-home environment. The depicted smart-home environment may include a structure, a house, office building, garage, mobile home, or the like. The devices of the smart home environment, such as the sensors 71, 72, the controller 73, and the network 70 may be integrated into a smart-home environment that does not include an entire structure, such as an apartment, condominium, or office space. A mobile device 75, having one or more sensors (e.g., as illustrated in FIG. 4 and described below) may be integrated into the smart-home environment, so that the sensors of the mobile device 75 transmit captured data to, for example, the controller 73 to determine whether a security event has occurred, including determining the security of the mobile device 75 itself. As disclosed herein, the mobile device 75 may be integrated with the security system when the mobile device is within a predetermined range of the security system.

The smart home environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like). One or more of the devices in the smart home environment need not physically be within the structure. For example, the controller 73 which may receive input from the sensors 71, 72 may be located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure. The one or more sensors 28 of the mobile device 75 may be integrated with the smart-home environment when the mobile device 75 is located within one of the plurality of rooms (e.g., when there is a communications link between the controller 73 and the mobile device 75 via the network 70).

The smart-home environment including the sensor network shown in FIGS. 2A-2B, which may include the one or more sensors 28 of the mobile device 75, may include a plurality of devices, including intelligent, multi-sensing, network-connected devices that can integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIGS. 2A-2B.

For example, a smart thermostat may detect ambient climate characteristics (e.g., temperature and/or humidity) and may control an HVAC (heating, ventilating, and air conditioning) system accordingly of the structure. For example, the ambient client characteristics may be detected by sensors 71, 72 shown in FIGS. 2A-2B, and the controller 73 may control the HVAC system (not shown) of the structure.

As another example, a smart hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIGS. 2A-2B and the controller 73 may control an alarm system to provide a visual and/or audible alarm to the user of the smart-home environment.

As another example, a smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 73.

In some implementations, the smart-home environment of the sensor network shown in FIGS. 2A-2B may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be or include one or more of the sensors 71, 72 shown in FIGS. 2A-2B. A smart wall switch may detect ambient lighting conditions, and control a power and/or dim state of one or more lights. For example, a sensor such as sensors 71, 72, may detect ambient lighting conditions, and a device such as the controller 73 may control the power to one or more lights (not shown) in the smart-home environment. Smart wall switches may also control a power state or speed of a fan, such as a ceiling fan. For example, sensors 72, 72 may detect the power and/or speed of a fan, and the controller 73 may adjusting the power and/or speed of the fan, accordingly. Smart wall plugs may control supply of power to one or more wall plugs (e.g., such that power is not supplied to the plug if nobody is detected to be within the smart-home environment). For example, one of the smart wall plugs may controls supply of power to a lamp (not shown).

In implementations of the disclosed subject matter, a smart-home environment may include one or more intelligent, multi-sensing, network-connected entry detectors (e.g., "smart entry detectors"). Such detectors may be or include one or more of the sensors 71, 72 shown in FIGS. 2A-2B, and/or may include one or more sensors of the mobile device 75 (e.g., sensors 28 shown in FIG. 4, when the mobile device is integrated with the security system). The illustrated smart entry detectors (e.g., sensors 71, 72, and/or one or more sensors 28 of the mobile device 75) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. According to the operating mode of the security system, the system may output an alarm and/or a notification message (e.g., to a user device, such as the mobile device 75, a smartphone, wearable computing device, personal computer, audible message via a speaker, or the like).

The smart-home environment of the sensor network shown in FIGS. 2A-2B can include one or more intelligent, multi-sensing, network-connected doorknobs (e.g., "smart doorknob"). For example, the sensors 71, 72 may be coupled to a doorknob of a door (e.g., doorknobs 122 located on external doors of the structure of the smart-home environment). However, it should be appreciated that smart doorknobs can be provided on external and/or internal doors of the smart-home environment.

The smart thermostats, the smart hazard detectors, the smart doorbells, the smart wall switches, the smart wall plugs, the smart entry detectors, the smart doorknobs, the keypads, and other devices of a smart-home environment (e.g., as illustrated as sensors 71, 72 of FIGS. 2A-2B and/or sensors 28 of FIG. 4 can be communicatively coupled to each other via the network 70, and to the controller 73 and/or remote system 74 to provide security, safety, and/or comfort for the smart home environment and to the mobile device 75).

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., mobile device 75 shown in FIG. 2B and FIG. 4, a smartphone, smart watch, wearable computing device, a tablet, radio frequency identification (RFID) tags, a key FOB, and the like). A webpage or application can be configured to receive communications from the user and control the one or more of the network-connected smart devices based on the communications and/or to present information about the device's operation to the user. For example, the user can view can arm or disarm the security system of the home.

One or more users can control one or more of the network-connected smart devices in the smart-home environment using a network-connected computer, portable electronic device, and/or mobile device 75. In some examples, some or all of the users (e.g., individuals who live in the home) can register their mobile device (e.g., the mobile device 75) and/or key FOBs with the smart-home environment (e.g., with the controller 73). In some implementations, the mobile device 75 may be registered with the security system by transmitting identifying information from the mobile device 75 to the security system via a communications link. The identification information may include one or more of, for example, a name, username, security code, an identification code, or the like. The registration of the mobile device 75 with the security system may integrate the operation of the mobile device 75 with the security system. For example, the registration of the mobile device 75 may allow the mobile device 75 to operate in the same mode as the security system, and/or to provide data capture with the sensors 28 to the controller 73 of the security system.

Such registration can be made at a central server (e.g., the controller 73 and/or the remote system 74) to authenticate the user and/or the mobile device 75 as being associated with the smart-home environment, to integrate the mobile device 75 with the smart-home environment and/or the security system, and to provide permission to the user to use the mobile device 75 to control the network-connected smart devices and the security system of the smart-home environment. The security system of the smart-home environment may also be used to provide security to the mobile device 75 (e.g., determine whether the device has been moved when the mobile device 75 and the security system are in a predetermined operating mode). A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment. The security system of the smart-home environment may monitor the location and movement of the mobile device 75 if it is within the smart-home environment, and may determine whether any movement of the mobile device 75 is a security event (e.g., the mobile device 75 is being taken and/or stolen, etc.).

In some implementations, the security system may change the mode of operation according to the location of the mobile device 75 (e.g., a smartphone, wearable computing device, or the like) of the registered user. For example, the system may determine, using GPS data from the mobile device 75, that the mobile device 75 is outside of a predetermined range from the home or building, and the system may correspondingly switch the operation mode to an away mode or vacation mode if no other occupants are in the home or building. In some implementations, the system may transmit a message to the mobile device 75 (e.g., smartphone, wearable computing device, or the like) to notify the user of the change in operation mode. Alternatively, or in addition, the system may transmit a request to the mobile device 75, so that the user may confirm or deny the request to change the operating mode of the security system.

When the mobile device 75 is in located within a predetermined range of the security system, the mode of operation of the mobile device and the security system may be the same. That is, when the mobile deice 75 is integrated with the security system as described above, the mode of operation of the mobile device 75 and the security system may be synchronized.

Alternatively, or in addition to registering electronic devices, the smart-home environment may make inferences about which individuals live in the home and are therefore users and which electronic devices are associated with those individuals. As such, the smart-home environment may "learn" who is a user (e.g., an authorized user) and permit the electronic devices (e.g., mobile device 75) associated with those individuals to control the network-connected smart devices of the smart-home environment (e.g., devices communicatively coupled to the network 70), in some implementations including sensors used by or within the smart-home environment. Various types of notices and other information may be provided to users via messages sent to one or more user electronic devices (e.g., mobile device 75). For example, the messages can be sent via email, short message service (SMS), multimedia messaging service (MMS), unstructured supplementary service data (USSD), as well as any other type of messaging services and/or communication protocols.

In some implementations, the security system and/or the smart-home environment may learn (e.g., by aggregating data detected by the sensors over a period of time) the amount of exit time and/or exit patterns of a user. For example, the system may learn which doors of the home a user frequently exits from, what times the doors are used for exit, the patterns of movement in the house by the user prior to exit (e.g., so that the system may change the operating mode to a transition mode, before changing to an away mode when the user has left), the amount of time the user takes to exit the home, or the like. The system may learn to provide the user more time to exit the home if needed, so that an unwanted alarm is not output.

A smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected smart devices in the smart-home environment (e.g., the mobile device 75). For example, in the event, any of the network-connected smart devices, such as smart wall plugs located outdoors, detect movement at night time, the controller 73 and/or remote system 74 can activate the outdoor lighting system and/or other lights in the smart-home environment.

The one or more sensors 71, 72 may be magnetic field sensors that detect a security event when a door and/or window of a building having the security system disclosed herein has been opened and/or compromised. In yet another example, the one or more sensors 71, 72 may be a smoke sensor and/or a carbon monoxide sensor that detect an environmental event when smoke is sensed and/or carbon monoxide is sensed.

More generally, the sensor 71, 72 and/or the one or more sensors 28 of the mobile device 75 may be any sensor capable of obtaining identifying information about a user, which can be used to determine whether the user is an authorized user by comparison to known information about the user.

In implementations of the disclosed subject matter shown in FIGS. 2A-2B, the remote system 74 may be a law enforcement provider system, a home security provider system, a medical provider system, and/or a fire department provider system. When a security event and/or environmental event is detected by at least one of one sensors 71, 72 and/or sensors 28, a message may be transmitted to the remote system 74. The content of the message may be according to the type of security event and/or environmental event detected by the sensors 71, 72. For example, if smoke is detected by one of the sensors 71, 72, the controller 73 may transmit a message to the remote system 74 associated with a fire department to provide assistance with a smoke and/or fire event (e.g., request fire department response to the smoke and/or fire event). Alternatively, the sensors 71, 72 and/or sensors 28 may generate and transmit the message to the remote system 74. In another example, when one of the sensors 71, 72 and/or sensors 28 detect a security event, such a window or door of a building being compromised, a message may be transmitted to the remote system 74 associated with local law enforcement to provide assistance with the security event (e.g., request a police department response to the security event).

The controller 73 and/or the remote system 74 may include a display to present an operational status message (e.g., a security event, an environmental event, an operational condition, or the like), according to information received from at least one or the sensors 71, 72 and/or the sensors 28. For example, the display of the controller 73 and/or remote system 74 may display the operational status message to a user while the user is away from the building having the security system disclosed herein. Alternatively, or in addition, the controller 73 may display the operational status message to a user when the user arrives at and/or departs (i.e., exits) from the building. For example, one or more sensors may identify and authenticate the user, and the security system may display the operational status message.

FIG. 2B shows a security system as disclosed herein that includes an alarm device 76, which may include a light and an audio output device. The alarm device 76 may be controlled, for example, by controller 73 and/or the mobile device 75. The light of the alarm device 76 may be activated so as to be turned on when one or more sensors 71, 72 and/or sensors 28 detect a security event and/or an environmental event. Alternatively, or in addition, the light may be turned on and off in a pattern (e.g., where the light is turned on for one second, and off for one second; where the light is turned on for two seconds, and off for one second, and the like) when one or more sensors 71, 72 and/or sensors 28 detect a security event and/or an environmental event. Alternatively, or in addition, an audio output device of the alarm device 76 may include at least a speaker to output an audible alarm when a security event and/or an environmental event is detected by the one or more sensors 71, 72 and/or sensors 28. For example, a security event may be when one or more sensors 71, 72 and/or sensors 28 are motion sensors that detect motion either inside a building having the security system disclosed herein, or within a predetermined proximity to the building. The speaker of the alarm device 76 may, for example, output a message when the user arrives at the building or departs from the building according to the operational status of the security system (e.g., a security and/or environmental event has been detected, an operational issue with the security system has been detected, the security system has been armed and/or disarmed, or the like).

FIG. 2B shows the mobile device 75 that may be communicatively coupled to the network 70 and/or a sensor (e.g., sensors 71, 72). The mobile device 75 may be a computing device as shown in FIG. 4 and described below, and/or a key FOB. A user of the security system disclosed herein may control the mobile device 75. For example, when the mobile device 75 is within a predetermined distance (e.g., one foot, five feet, 10 feet, 20 feet, 100 feet, or the like) from the sensor 71, 72, the mobile device 75 and the sensor 71, 72 may communicate with one another via Bluetooth signals, Bluetooth Low Energy (BTLE) signals, Wi-Fi pairing signals, near field communication (NFC) signals, radio frequency (RF) signals, infra-red signals, and/or short-range communication protocol signals. The communication between the mobile device 75 and the sensor 71, 72 may be used to establish a communications link between the mobile device 75 and the network 70. The device 75 may provide identifying information to the sensor 71, 72, which may be provided to the controller 73 to determine whether the device 75 belongs to an authorized user of the security system disclosed herein. Alternatively, the controller may establish a communications link with the network 70 directly.

The controller 73 may monitor the location of the mobile device 75 to determine where the user is located within the home. That is, the controller 73 may communicate with one or more sensors 71, 72 and/or with sensors 28 (as shown in FIG. 4) of the mobile device 75 to determine the location of the user within the home. In some implementations, the controller 73 may map the location and/or movement (e.g., track the movement) of the user. In some implementations, so as to maintain privacy, the sensors 71, 72 and/or sensors 28 may capture data so as to determine the location of the user, but may refrain from capturing image data of the user (e.g., images of the user via a camera that is the sensor 71, 72, and/or images via the sensors 28 of the mobile device 75). For example, when the security system is operating in a home mode, the controller may use infra-red (IR) data and/or motion data from the sensors 71, 72 to determine the location of user. The security system may also use, for example, accelerometer and/or electronic compass data from sensors 28 of the mobile device 75 to determine the location and/or movement of the user in the home.

The controller 73 may monitor the location of the mobile device 75 in order to determine whether to change the operation mode of the security system (e.g., from a home mode to an away mode). The controller 73 may change the mode of the security system according to, for example, whether the mobile device 75 is within a predetermined area, a home, and/or a building. For example, when the registered electronic device is determined by the controller 73 to be within the home or building, and/or within a predetermined area adjacent to the building (e.g., the front or back yard of a home, or the like), the security system may change the operation mode to a home mode. When the controller 73 determines that the mobile device 75 is outside of the home or building, and/or outside of the predetermined area adjacent to the home or building, the security system may change the mode from a home mode to an away mode (e.g., if there are no other occupants in the home or building). In some implementations, the security system may transmit a notification to the mobile device 75 to inform the user of the change in the operation mode, and/or to request confirmation of the change in the mode. That is, the mobile device 75 and the security system may operate in different modes, according to the location of the mobile device 75 (e.g., outside of the home or building, etc.).

The security system may determine that the user is exiting the home or building according to the position of the user device and/or determination of the user location as detected by sensors 71, 72 and/or sensors 28. The security system may, for example, change from the home mode to a transition mode as the user is attempting to exit. When the mobile device 75 is determined to be with the user who is exiting, the system may transmit a message to the mobile device 75 to request if the user needs more time to exit before the system changes from the transition mode to, for example, an away mode. With the device, or with a voice command that is detected by the sensors 71, 72, the system may provide extra time for the user to exit the home or building. Alternatively, the system may determine that the user has exited using data form the sensors 71, 72, and may change the mode from the transition mode to, for example, an away mode. When the mobile device 75 is determined to be with the user who is exiting, the security system may request that the user acknowledge the change in mode of the security system via, for example, the mobile device 75.

When the user exits the home or building without the mobile device 75 (i.e., the mobile device 75 remains within the home or building), the mobile device 75 may change from, for example, the home mode, to the transition mode, and to the away mode in the same manner as the security system as described above. When the user exits the home or building with the mobile device 75, the mobile device may change to a different operating state than that of the security system of the home or building. For example, with the user exiting the home with the mobile device, the security system may change to an away mode, and the mobile device may have a different operating mode (e.g., such as a mode that indicates that the mobile device 75 is not part of the security system). That is, in some implementations, the operating mode of the mobile device 75 may change so as to be synchronized with the security system, or, in some implementations, may change and be independent of the security system.

In some implementations, the security system may provide audio (e.g., via a speaker) and/or visual indicators (e.g., via a display that may be included in and/or coupled to the controller 73, the mobile device 75, or the like) to inform the user as to the mode that the security system is operating in (e.g., home, away, stay, transition, or the like). In particular, the system may indicate that it is in a transition mode so as to allow a user to exit the building or home. The visual indicator may include a particular color (e.g., yellow or the like) so that the user may easily know that the system is in a transition mode. In another example, the when a color is used to indicate the operating mode of the security system, color may be flashed and/or blinked so as to indicate a transition to another operation mode.

In example implementations of the disclosed subject matter, the mobile device 75 may be associated with an authorized user. The predetermined area may be defined, for example, according to, for example, geo-fencing data, placement and/or range of sensors 71, 72, a defined distance from the home or building having the security system disclosed herein, and the like. The controller 73 may change the operating mode of the security system (e.g., from home to away, or away to home, or the like) according to whether the mobile device 75 is occupying the home or building. An operating mode of the mobile device 75 may change according to whether the mobile device is determined to be within the home or building, and/or whether it is communicatively coupled to the security system.

For example, when the authorized user and the mobile device 75 are outside of the predetermined area (e.g., the user is outside of the home or building), the controller 73 may change the operating mode of the security system (e.g., from home mode to away mode). In determining whether to change the operating mode of the security system, the controller may gather data from the sensors 71, 72, to determine whether any other person is in the building. When the security system is in an away mode, and the user and the mobile device 75 return to the predetermined area of the security system (e.g., the user occupies the home or building), the controller may change the mode, for example, from an away mode to a home mode according to the signals received by the sensors 71, 72 from the device 75.

When the mobile device 75 is within the predetermined area, but the user is outside of the predetermined area (e.g., the mobile device 75 has not moved with the user), the operating modes of the security system and the mobile device 75 may be changed (e.g., so as to be the same). That is, the mobile device 75 and its sensors 28 may integrally operate with the security system.

In FIGS. 2A-2B, the sensor 71, 72 and/or sensor 28 may be a camera to capture an image of a face of a person to be transmitted to the controller 73, where the controller 73 compares the captured facial image with a pre-stored image. When it is determined by the controller 73 that at least a portion of the captured facial image matches the pre-stored image, the controller 73 determines that the person is an authorized user of the security system disclosed herein. The controller 73 may change the mode of the security system according to the determination of whether the person is an authorized user. In some implementations, the mobile device 75 may change the mode of operation so as to correspond to the mode of the security system.

The sensor 71, 72 and/or sensors 28 may be a camera to capture a retinal image from a person to be transmitted to the controller 73, where the controller 73 compares the captured retinal image with a pre-stored image. When it is determined by the controller 73 that at least a portion of the captured retinal image matches the pre-stored image, the controller 73 determines that the person is an authorized user of the security system disclosed herein. The controller 73 may change the mode of the security system according to the determination of whether the person is an authorized user. In some implementations, the mobile device 75 may change the mode of operation so as to correspond to the mode of the security system.

The sensor 71, 72 and/or sensors 28 may be a microphone to capture a voice of a person to be transmitted to the controller 73, where the controller 73 compares the captured voice with a pre-stored voice. When it is determined by the controller 73 that at least a portion of the captured voice matches the pre-stored voice, the controller 73 determines that the person is an authorized user of the security system disclosed herein.

When the sensor 71, 72 and/or 28 is a microphone, it can be used to detect noise and/or sound, and convert the detected noise and/or sound into data to be transmitted to the controller 73. The controller 73 may, for example, compare the sound data with pre-stored data to determine whether the detected noise and/or sound are at least similar, and, if so, may determine that the detected noise and/or sound is a security event. The controller may, for example, control an output of an audible and/or visual alarm, and/or provide a notification regarding the security event.

In some implementations, the controller 73 may provide an operational status message to the user via a speaker (i.e., audio output 77), a display (e.g., where the display is coupled to the controller 73 and/or remote system 74), and/or the device 75. The operational status message displayed can include, for example, a message that a security event and/or environmental event has occurred. When the sensors 71, 72 and/or sensors 28 have not detected a security and/or environmental event, a message may be displayed that no security and/or environmental event has occurred. In implementations of the subject matter disclosed herein, the mobile device 75 may display a source of the security event and/or environmental event, a type of the security event and/or environmental event, a time of the security event and/or environmental event, and a location of the security event and/or environmental event.

In implementations of the disclosed subject matter, the mobile device 75 may be communicatively coupled to the network 70 so as to exchange data, information, and/or messages with the sensors 71, 72, the controller 73, and the remote system 74.

In implementations of the disclosed subject matter, the controller 73 can request entry of an access code from the mobile device 75 and/or a keypad communicatively coupled to the controller 73. Upon receipt of the access code, the security system disclosed herein may be disarmed and/or may change operating modes (e.g., from an away mode to a home mode, or the like), and/or may provide an operational status message to the user via a display coupled to the controller 73 and/or the mobile device 75. Alternatively, or in addition, an operational status message may be output via a speaker of the alarm device 76.

For example, a preset time (e.g., a preset timer of 15 seconds, 30 seconds, 1 minute, 5 minutes, or the like) may be set for the security system to allow for a user to exit the home, building, or a predetermined area before the system changes the operating mode (e.g., from a transition mode to an away mode, or the like). That is, the security system may have a timer that counts down from a preset time before changing the operating mode. In some implementations, the system may operate in a transition mode during the count down, and then may change to a different operating mode when the countdown in complete (e.g., to an away mode or the like). The predetermined area may be a designated perimeter surrounding a home or building, or any other suitable area. An active count down timer may be displayed on a display that is coupled to the controller 73 and/or the alarm device 76. Alternatively, or in addition, the active count down timer may be displayed on a user's electronic device (e.g., device 75) that may be registered with the controller 73 and/or alarm system 76. A preset time may be set for the security system to allow for a user to enter the home, business, and/or predetermined area and change the operating mode (e.g., from an away mode to a home mode). The preset time for entry and the preset time to exit may be the same amount of time, or can be set to provide different amounts of time.

If a user needs more time to enter or exit the home, building, and/or predetermined area with the security system, an electronic device of the user (e.g., mobile device 75, a smartphone, smart watch, wearable computing device, a key FOB, RFID tag, or the like, such as device 75) can request, upon receiving input from the user, that the controller 73 provide additional time beyond the preset time to allow for the user to enter or exit the home. Alternatively, or in addition, the security system disclosed herein may extend the preset time to enter or exit. For example, the time may be extended for exiting the home while the user and/or the user's electronic device are in the home. Alternatively, or in addition, the device 75 may transmit a command (e.g., when input is received from the user) to the controller 73 to disengage the exit process (e.g., the controller 73 and/or the alarm device 76 are disengaged from counting down the preset time before changing the operating mode of the system). In some implementations, the security system may query the user whether the user needs more time to exit, by outputting an audible message (e.g., via a speaker) and/or a visual message (e.g., via a display device that is part of a controller or a user device). The user may respond to the system query via a voice command (e.g., that is received by a sensor, such as sensors 71, 72, that may include a microphone) and/or via a user input (e.g., received via the device 75 and/or the controller 73).

In another example, when the user returns to the home, building, or the predetermined area, a preset time for entry to disarm the alarm device 76 and/or change the operating mode of the security system may be extended according to whether the user has an electronic device (e.g., device 75, which may be a smartphone, smart watch, wearable computing device, key FOB, RFID tag, fitness band or sensor, or the like) that is registered with the controller 73. That is, the sensors, 71, 72 may detect the presence of the device 75 with the user, and may change the operating mode of the security system (e.g., from an away mode to a home mode, or the like). When the sensors 71, 72 determine that the user does not have the device 75, the controller 73 may extend the preset time so that a user may be given additional time to enter a code on, for example, a keypad communicatively coupled to the controller 73, to disarm the alarm device 76 and/or change the mode of the security system (e.g., from an away mode to a home mode, or the like).

In implementations of the disclosed subject matter, when the user returns to the home, building, predetermined area, and is identified by the sensors 71, 72 and/or controller 73 as being an authorized user, the mode of the security system may be changed (e.g., from an away mode to a home mode), and one or more of the sensors 71, 72 may be disabled. For example, one or more of the sensors 71, 72 may be motion sensors, and may be disabled by the controller 73 when the person detected by the sensors 72, 72 is the authorized user.

As discussed below in connection with FIG. 4, the mobile device 75 may include sensors 28, which, in some implementations, may capture authentication information received by the mobile device 75 via the sensors 28. The captured authentication information may be a facial image, a retinal image, a voice, an access code, or the like, similar to the captured authentication information as described above in connection with sensors 71, 72. The mobile device 75 may also receive a command and/or input from a user to unlock the device (e.g., an access code, a fingerprint, a facial image, a retinal image, or the like) to access functionality of the mobile device 75. The authentication information captured by the sensors 28 and/or a notification that the mobile device 75 is unlocked may be transmitted by the mobile device 75 to the security system. This may update the operation mode of the security system, which may have been changed according to a security event generated by the mobile device 75 being moved and/or a security event detected by the sensors 71, 72 (e.g., motion detection in a protected room and/or area, motion detection during an unexpected time and/or in an unexpected location, or the like). That is, the authentication information and/or the notification that the mobile device 75 is unlocked may be used by the controller 73 of the security system to refrain from outputting an alarm via the alarm device 75, and/or clear an alarm or pre-alarm condition (e.g., when the security system is in a transition mode to provide time for the user to enter an access code) that was triggered by the mobile device 75 being moved and/or a security event determined by the security system.

As illustrated in FIGS. 2A-2B, a security system can include sensors (e.g., sensors 71, 72, and/or sensors 28 of the mobile device 75) to detect a location of at least one user, and generate detection data according to the detected location of at least one user of the security system. The detection data may be generated by the sensors 71, 72. For example, the at least one user may be one or more members of a household, and the security system may monitor their location using the sensors 71, 72 to determine whether to arm or disarm the alarm device 76. A processor, such as the controller 73 illustrated in FIGS. 3A-3B and described above, may be communicatively coupled to the sensors 71, 72, and can receive the detection data. The controller 73 can determine whether the at least one user is occupying the home or building, or is within a predetermined area, according to the detection data. The predetermined area may be set according to the boundaries of a home or building, geofencing data, motion data, a door positon event, a distance from one or more sensors, and the like.

In some implementations, the sensors 71, 72 can detect that a location of the user is outside of the home, building, and/or predetermined area, and that a user's first electronic device (e.g., a smartphone, smart watch, wearable computing device, or the like) is within the home, building, and/or predetermined area. The controller 73 can determine whether to change the operating mode of the security system according one a location of a user's second electronic device (e.g., a key FOB, radio frequency identification (RFID) tag, fitness band or sensor, or the like), geofencing data, and the detection data from the sensors 71, 72.

The security system disclosed herein includes an alarm device, such as the alarm device 76 illustrated in FIG. 2B and discussed above, which can be armed or disarmed by the controller 73 according to the determination as to whether the at least one user is within the home, building, and/or predetermined area.

For example, if the controller 73 determines that the members of a household (e.g., the users of the home security system) have exited the home or building, and/or are outside of the predetermined area, the controller 73 may change the operating mode of the security system (e.g., from a home mode to an away mode). The sensors 71, 72 may determine the location of the members of the household according to their respective electronic devices (e.g., smartphones, smart watches, wearable computing devices, radio frequency identification (RFID) tags, fitness bands or sensors, tablet computers, key FOBs, and the like), according images captured by the sensors, according to the sensors detecting one or more doors opening and closing, and the like. The controller 73 may aggregate detection data from the sensors 71, 72 and store it in a storage device coupled to the controller 73 or the network 70. The data aggregated by the controller 73 may be used to determine entrance and exit patterns (e.g., what days and times users enter and exit from the house, what doors are used, and the like) of the members of the household, and the controller 73 may change the security mode according to the determined patterns.

In some implementations, the security system may "learn" the exit patterns of the users, and may take action when the user action is different from the learned patterns. For example, when the system determines that the user is exiting the home, but the user is taking a longer amount of time that usual, the system may notify the user (e.g., via an audio and/or visual message) that the transition mode may be extended so as to allow the user additional time to exit, before the system changes to, for example, an away mode. If the system determines that the exit pattern of the user is different than a learned exit pattern, the system may adjust the amount of time that the system operates in the transition mode before changing to a different mode (e.g., when the system determines that the user exits, or determines that the user that the user is not leaving the home due to an event, such as a telephone call, another person arriving at the home, or the like).

In implementations of the disclosed subject matter, one or more user electronic devices (e.g., mobile device 75) can be registered with the controller 73, and the at least one of the sensors 71, 72 transmits a location request signal to the mobile device 75. In response to the location request signal, the mobile device 75 can transmits a location signal, and the controller 73 can determine the location of the mobile device 75 according to the received location signal. The location request signal and the location signal can be Bluetooth signals, Bluetooth Low Energy (BTLE) signals, radio frequency (RF) signals, near field communications (NFC) signals, and the like.

The controller 73 can transmit a request message to be displayed by the mobile device 75. The message may be, for example, a reminder to change the operating mode of the security system and/or the mobile device 75. Upon displaying the message, the electronic device receives input to change the operating mode of the security system and/or mobile device 75 according to the displayed request message, and transmits the received input to the controller 73 so as to control the security system. For example, the message may display a selectable button to change the operating mode of the alarm device 76. In another example, the controller can request a code from the user to change the operating mode of the alarm device 76. When the user provides the code to the mobile device 75, which correspondingly transmits the entered code to the controller 73, the controller 73 may control the changing of the mode of the security system. Alternatively, or in addition, the controller 73 can control the alarm device 76 to be automatically changed to an away mode when the user determined to be outside of the home, building, and/or predetermined area. When the mobile device 75 remains in the home, building, and/or predetermined area, the operating mode of the mobile device 75 may be automatically changed (e.g., by the controller 73) so as to be the same as the controller 73. Alternatively, or in addition, the user may change the operating mode of the alarm device 76 by placing the mobile device 75 (e.g., a registered smartphone, smart watch, key FOB, RFID tag, fitness band or sensor, wearable computing device, or the like) within a predetermined distance to the sensors 71, 72, where the sensors determine that the device 75 is a registered device, and the controller 73 controls the alarm device 76 to change the operating mode (e.g., change from an away mode to a home mode).

In the security system disclosed herein, sensors 71, 72, and/or sensors 28 can detect a security event, such as a door event (e.g., where a door to a house is opened, closed, and/or compromised), a window event (e.g., where a window of a house is opened, closed, and/or compromised), and/or the movement (e.g., unauthorized taking) of the mobile device 28. For example, the sensors 71, 72 may have an accelerometer that identifies the force on the door or window as a compromising event. The sensors 28 of the mobile device 75 may include an accelerometer to determine whether the mobile device 75 is being moved from location, where the movement of the mobile device is not authorized or expected (e.g., according to stored patterns of movement). In another example, the sensors 71, 72 may contain an accelerometer and/or compass, and the compromising event may dislodge the sensor from the door or window, and the motion of the sensor 71, 72 may identify the motion as a compromising event.

The sensors 71, 72 may be door and/or window sensors which may determine whether the door and/or window is opened from the inside or the outside (e.g., inside the house, building, and/or a predetermined area). The sensors 28 of the mobile device 75 may, for example, verify the data captured by the sensors 71, 72 regarding the opening of a door and/or window, and/or may be used to independently detect, for example, the opening of a door and/or window. Alternatively, or in addition, the controller 73 and/or the mobile device 75 may determine, according to data received from the sensors 71, 72, and/or sensors 28 whether a door and/or window are opened and/or closed from the inside or outside. For example, the sensors 71, 72 and/or 28 may include an accelerometer and/or compass, and thus the direction of a door opening may be determined. In some implementations, the sensors 71, 72 and/or sensors 28 of the mobile device 75 may detect a person and/or user is within a distance from the door and/or window, where the person and/or user may be detected to be on the outside or the inside. The sensors 71, 72 and/or sensors 28 may determine when the door and/or window is opened, and may correlate the detected user position (e.g., where the detected position is inside or outside) with the opening of the door and/or window. Alternatively, or in addition, when a door is opened, a smart doorknob may determine whether the door is opened from the inside or the outside.

In some implementations of the disclosed subject matter, the controller 73 may control the alarm device 76 so as to refrain from activation (e.g., outputting an audio and/or visual alarm) when the controller 73 determines that the door and/or window is opened from inside the home, building, and/or predetermined area. Alternatively, or in addition, the mobile device 75 may control the alarm device 76 to refrain from activation by determining and/or confirming that a door and/or window is opened from inside the home, building, and/or predetermined area. In some implementations, the data from sensors 28 of the mobile device 75 may confirm the instructions to the alarm device 76 to refrain from activation.

In implementations of the disclosed subject matter, the controller 73, remote system 74, and/or mobile device 75 may set a failsafe period with the alarm device 76. That is, the failsafe period may be provided for users to exit the home, building, and/or predetermined area. After the expiration of the failsafe period, the alarm device 76 of the security system may be armed. In some implementations, the controller 73 may reduce the failsafe period when the sensors 71, 72 and/or sensors 28 detect that one or more users have exited the home, building, and/or predetermined area.

The controller 73 may control the output an alarm from the alarm device 76, for example, according to whether the detected door event or window event is from an outside location (e.g., outside the house, building, or the like), and/or whether the mobile device 75 is moving when not authorized to do so (e.g., the mobile device is being taken without authorization). That is, the controller 73 may control the alarm device 76 to output an audible alarm and/or message via a speaker when a door event or window event is detected by the sensors 71, 72, and/or sensor 28, and/or when the mobile device 75 is moved when not authorized, and/or when the mobile device 75 is removed from a predetermined area. A light of the alarm device 76 may be activated so as to be turned on when one or more sensors 71, 72 and/or detect a security event, such as a door or window event, and/or an unauthorized movement of the mobile device 75. Alternatively, or in addition, a light may be turned on and off in a pattern (e.g., where the light is turned on for one second, and off for one second; where the light is turned on for two seconds, and off for one second, and the like) when one or more sensors 71, 72 and/or sensors 28 detect a security event such as the window and/or door event, and/or the unauthorized movement of the mobile device 75.

In implementations of the disclosed subject matter, the controller 73 can set and/or designate one or more doors, windows, and/or entryways, and the like that may be opened and/or used for exit upon arming of the alarm device 76. Alternatively, or in addition, the mobile device 75 may control the selection of the one or more doors, windows, and/or entryways to be designated for entry and/or exit. That is, the selected doors, windows, and/or entryways may be opened and/or used for exit when the security system is operating in, for example, the home mode. For example, a door can be selected for exit by the controller 73, so that a user may exit the house or building without the system outputting an alarm and/or notification message. The selected door may be a door that opens from inside the home, building or predetermined area to outside the home, building, or predetermined area. That is, the door may be an exterior door that leads from, for example, an interior space of a home or building, to an area outside of the home or building. After exit of the user, the controller 73 may de-select the door, such that further attempts to open and/or close the door will output an alarm from the alarm device 76 and/or output a notification message.

The controller 73 and/or the mobile device 75 may be set so that the movement of the mobile device 75 (e.g., any movement and/or movement from a predetermined area) may, for example, output an alarm from the alarm device 76 and/or provide notifications.

The controller 73 and/or the mobile device 75 can control the setting of the operation mode of the security system according to a preset time period for a user to enter or exit a home, building, and/or predetermined area associated with the security system. The preset time can be adjusted by the controller 73 and/or the mobile device 75 according to the user. For example, as discussed herein, the controller 73 can aggregate data from the sensors 71, 72 and/or sensors 28 to determine when a user enters and exits the home (e.g., the days and times for entry and exit, the doors associated with the entry and exit, and the like). For example, the controller 73 can adjust the amount of time for the security system to be in the transition mode to be longer or shorter (e.g., before changing to the away mode), according to the amount of time the user takes to exit the house according to the aggregated data.

In the security system disclosed herein the at least one sensor determines that the user is outside of the home, building, and/or predetermined area for a time greater than a preset time, the controller 73 and/or the mobile device 75 can control the security system to transition from a first security mode to a second security mode. According to the location of the mobile device 75 (e.g., within a predetermined area), the mobile device may transition from a first security mode to a second security mode. The second security mode may provide a higher level of security than the first security mode. For example, the system may transition from a first mode, such as a home mode, to a second mode, which may be a vacation mode, where the user of the security system disclosed herein (e.g., the members of a household) are away from the house for a period of time (e.g., 1 day, 3 days, 5 days, 1 week, 2 weeks, 1 month, or the like). As discussed herein, the controller 73 may aggregate the detection data received from the sensors 71, 72 and/or the sensors 28 over a preset time (e.g., 1 week, 1 month, 6 months, 1 year, or the like) to determine a pattern for when the user is within the predetermined location or not.

That is, in implementations of the disclosed subject matter, the controller 73 may configure, set, and/or store allowance data which may determine which entryways may be used for entry and exit to a home, building, and/or predetermined area. The allowance data may also be used when the mobile device 75 is integrated with the security system, such that the controller 73 may activate the alarm device 76 when the mobile device is moved when the security system is operating in a particular mode. The mobile device 75 may control the controller 73 so as to configure, set, and/or store the allowance data. In an example, the controller 73 may configure the allowance data to allow a user to exit though one or more preset doors without activating the alarm device 76. In another example, the controller 73 may configure the allowance data to allow motion within the home, building, and/or predetermined area without activating the alarm device, and/or to allow motion of the mobile device 75 within the home, building, and/or predetermined area without activating the alarm device. That is, the sensors 71, 72 and/or sensors 28 may detect motion and/or a user, and, according to the allowance data, and the controller 73 may control the alarm device 76 to refrain from activating an audio and/or visual alarm, and/or from transmitting a notification message. In some implementations, the allowance data may be used in conjunction with user identification data (e.g., information from the sensor 71, 72 and/or sensors 28 which identify the user as an authorized user) by the controller 73 to control the alarm device 76 to refrain from activating an audio and/or visual alarm, and/or from transmitting a notification message.

The allowance data may include, for example, selection of one or more doors, windows, entryways, predetermined areas (e.g., rooms, outdoor areas, predefined areas, and the like), users, times (e.g., times allotted to exit before arming the alarm device 76, times of day to allow entry and/or exit, etc.), and the like to allow exit from the home, building, and/or predetermined area (e.g., without activation of the alarm device 76). The allowance data may include limitations on the movement of the mobile device 75 (e.g., that may be integrated with the security system) within the home, building, and/or predetermined area when the mobile device and/or security system is operating in a particular mode (e.g., an away mode). The allowance data may allow the mobile device 75 to be located outside of the predetermined area when the device is not integrated with the security system and/or when the mobile device is operating in a particular mode.

In an example, the allowance data may be configured by the controller 73 so that the sensors 71, 72 detect security events from a perimeter of a predetermined area (e.g., rather than in an interior of a home or building). In this example, the users may be in the home, as confirmed by the sensors 71, 72, and the allowance data may be configured so that the sensors 71, 72 disposed on a perimeter of a predefined area (e.g., around the perimeter of a property on which the home is) may be active. In some implementations, the sensors 28 of the mobile device 75 may be used to correlate, verify, confirm, and/or supplement the data collected by the sensors 71, 72.

In another example, the controller 73 may configure the allowance data so that when at least one user is within the home, building, and/or predetermined area, one or more other users are permitted to enter the home, building, and/or predetermined area or be within a preset distance of the predetermined area without activating the alarm device 76 so as to output an alarm and/or transmit a notification message. In this example, the sensors 71, 72 and/or sensors 28 may identify the other users as users that are registered with the controller 73 and/or the remote system 74.

In another example, the controller 73 may configure the allowance data so as to allow a user (e.g., a user registered with the controller 73 and/or remote system 74) to exit the home, building, and/or predetermined area without activating the alarm device 76 so as to output an alarm and/or transmit a notification message. When the mobile device 75 is integrated with the security system, the security system may, for example, receive data from sensors 28 to determine whether the mobile device 75 is moved when the user has exited the home, building, or predetermined area without the mobile device 75 (i.e., the mobile device 75 remains within the home, building, and/or predetermined area).

In some implementations, the security system may configure the allowance data so as to change the operating mode according to data detected by the sensors (e.g., sensors 71, 72, and/or sensors 28). For example, when the sensors detect that a user is leaving the home or building, the system may change from a home mode to a transition mode to allow for the user to exit. The allowance data may determine the length of time to allow the user to exit the home or building before changing to an away mode. The allowance data may also control the security system so that as long as the user is still in the house, but is attempting to leave, the system will remain in transition mode. In some implementations, if the system is in a transition mode, but determines, according to the user activity, that the user is no longer leaving the home, the system may change the operating mode (e.g., to the mode that the system was in prior to the transition mode, such as the home mode or stay mode). In some implementations, the security system may determine that the mobile device 75 (e.g., that has been integrated with the security system) may remain within the home, building, or predefined area when a user has exited. The security system may monitor any movement of the mobile device when the user has exited, and may activate an alarm device 76 and/or provide notifications (e.g., to the controller 73, the remote system 74, etc.) when the mobile device is determined to be in motion.

In implementations of the disclosed subject matter, the allowance data may be configured so that the operating mode of the security system and/or mobile device 75 (e.g., when the mobile device 75 is integrated with the security system) may change according to room in the home or building a user and/or the mobile device 75 is determined to be in. For example, if the system determines from the sensor data that the user and/or mobile device 75 is in or has moved to a bedroom, the system may change an operating mode of the security system and/or the mobile device 75 from a home mode to a stay mode. If the system determines, for example, that the user and/or the mobile device 75 is in or has moved to the kitchen of the home, the system may change to a home mode. If the system determines that the user has moved to the garage and has opened the garage door, the system may change to a transition mode, as it is expect that the user will exit the garage (e.g., in a car). The security system may determine whether the mobile device 75 is with the user who is attempting to exit, and may set the mode according to the determination. When the user leaves (e.g., as detected by the sensors), the system can change from the transition mode to an away mode. When the mobile device 75 is determine to remain in the home, the mode of the mobile device is changed to the away mode. When the mobile device is determined to move with the exiting user, the mobile device may exit from the integration with the security system, or may change to a different mode from that of the security system.

Figure 3:
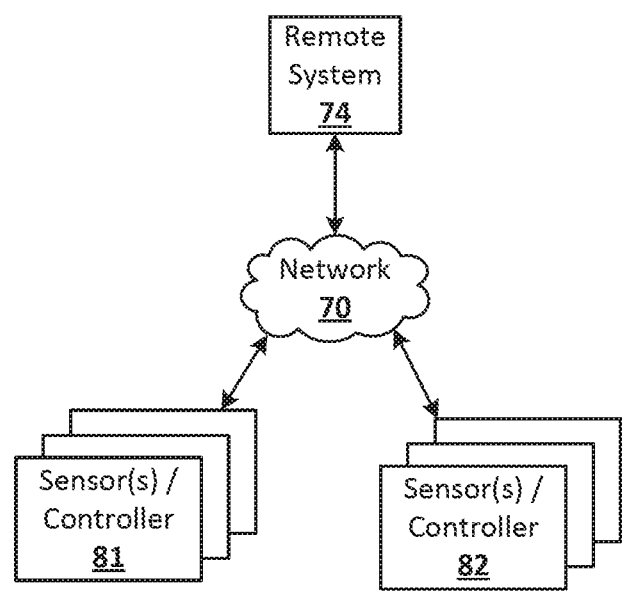
FIG. 3 shows a remote system to aggregate data from multiple locations having security systems according to an implementation of the disclosed subject matter.

In some configurations, as illustrated in FIG. 3, a remote system 74 may aggregate data from multiple locations, such as multiple buildings, multi-resident buildings, and individual residences within a neighborhood, multiple neighborhoods, and the like. In general, multiple sensor/controller systems 81, 82 as previously described with respect to FIGS. 2A-2B may provide information to the remote system 74. The systems 81, 82 may provide data directly from one or more sensors as previously described, may include data from one or more mobile devices (e.g., mobile device 75), or the data may be aggregated and/or analyzed by local controllers such as the controller 73, which then communicates with the remote system 74. The remote system may aggregate and analyze the data from multiple locations, and may provide aggregate results to each location. For example, the remote system 74 may examine larger regions for common sensor data or trends in sensor data, and provide information on the identified commonality or environmental data trends to each local system 81, 82.

In situations in which the systems discussed here collect personal information about users, or may make use of personal information, the users may be provided with an opportunity to control whether programs or features collect user information (e.g., a user's current location, a location of the user's house or business, or the like), or to control whether and/or how to receive content from the content server that may be more relevant to the user. In addition, certain data may be treated in one or more ways before it is stored or used, so that personally identifiable information is removed. For example, specific information about a user's residence may be treated so that no personally identifiable information can be determined for the user, or a user's geographic location may be generalized where location information is obtained (such as to a city, ZIP code, or state level), so that a particular location of a user cannot be determined. As another example, systems disclosed herein may allow a user to restrict the information collected by those systems to applications specific to the user, such as by disabling or limiting the extent to which such information is aggregated or used in analysis with other information from other users. Thus, the user may have control over how information is collected about the user and used by a system as disclosed herein.

Figure 5:
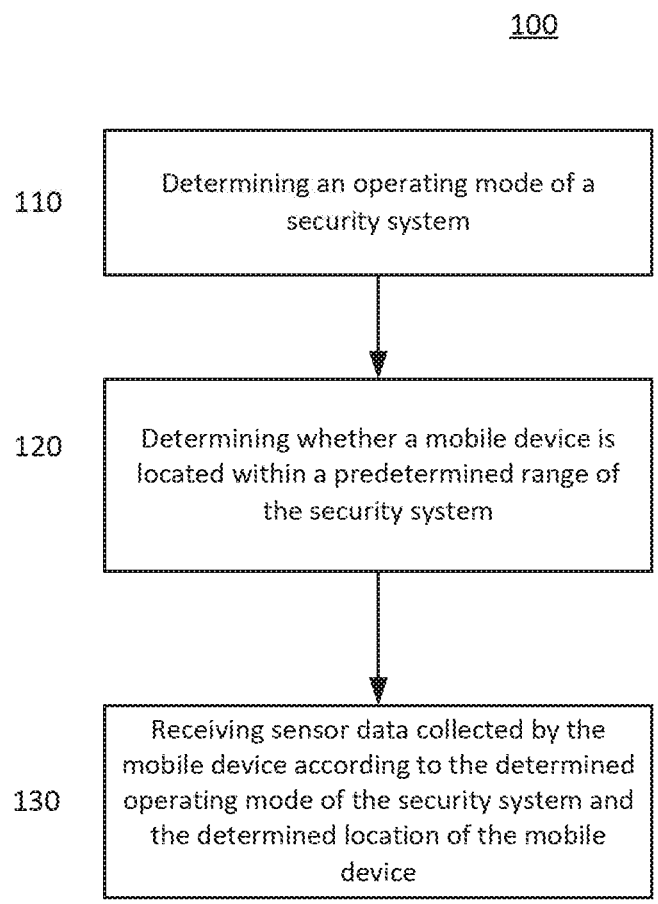
FIG. 5 shows example operations of a method of integrating data captured by one or more sensors of a mobile device with a security system according to an implementation of the disclosed subject matter.

The mobile device 75 as discussed above in connection with FIGS. 2A-2B is shown in FIG. 5 The mobile device 75 may be used to implement a controller, a device including sensors as disclosed herein, or the like. Alternatively or in addition, the mobile device 75 may be, for example, a computer (e.g., a laptop computer), or a mobile computing device such as a smart phone, tablet, wearable computing device, smart watch, key FOB, or the like. The mobile device 75 may include a bus 21 which interconnects major components of the computer 20, such as a central processor 24, a memory 27 such as Random Access Memory (RAM), Read Only Memory (ROM), flash RAM, or the like, a user display 22 such as a display screen and/or lights (e.g., green, yellow, and red lights, such as light emitting diodes (LEDs) to provide the operational status of the security system to the user, as discussed above), a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, one or more sensors 28, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the mobile device 75 are generally stored on and accessed via a computer readable storage medium.

The fixed storage 23 may be integral with the mobile device 75 or may be separate and accessed through other interfaces.

The one or more sensors 28 may include an accelerometer, a microphone, a light sensor, a camera, proximity sensor, a temperature senor, a physical orientation sensor, a location sensor, and the like.

The network interface 29 may provide a direct connection to a remote server via a wired or wireless connection. The network interface 29 may provide a communications link with the network 70, sensors 71, 72, controller 73, and/or the remote system 74 as illustrated in FIGS. 2A-2B. The network interface 29 may provide such connection using any suitable technique and protocol as will be readily understood by one of skill in the art, including digital cellular telephone, radio frequency (RF), Wi-Fi, Bluetooth®, Bluetooth Low Energy (BTLE), near-field communications (NFC), and the like. For example, the network interface 29 may allow the device to communicate with other computers via one or more local, wide-area, or other communication networks, as described in further detail herein.

FIG. 5 shows example operations of a method 100 of integrating data captured by one or more sensors of the mobile device 75 with the security system according to an implementation of the disclosed subject matter. In operation 110, the operating mode of the security system is determined. For example, the operating mode may be determined by the controller 73 shown in FIGS. 2A-2B. The determined operating mode may be, for example, a home mode, a stay mode, an away mode, a vacation mode, a transition mode, or the like.

At operation 120, the controller 73 may determine whether the mobile device 75 is located within a predetermined range of the security system. The sensors 71, 72 may be used by the controller 73 to determine whether the mobile device 75 is located within the predetermined range. The predetermined range of the security system may be, for example, inside of the home or building, within a predetermined perimeter surrounding the home or building, and/or within a predetermined geofenced area. In some implementations, the predetermined range may be the operating range of the sensors 71, 72 of the security system, the operating range of the network 70 of the security system, or the like.

When it is determined that the mobile device 75 is located within the predetermined range, sensor data (e.g. data collected by sensors 28 of the mobile device 75) may be received by the security system according to the determined operating mode of the security system at operation 130. In some implementations, the operating mode of the security system may be such that no data is collected from the mobile device 75. In some implementations, the operating mode of the security system may request data from the mobile device 75. When the mobile device 75 is not located within the predetermined range, the mobile device 75 may refrain from transmitting sensor data to, for example, the controller 73.

For example, when the security system is in the home mode, the mobile device 75 may not transmit captured data from the sensors 28 to the security system, but may transmit the captured data when the security system is in, for example, the stay mode, the away mode, and the vacation mode. In some implementations, the mobile device 75 may be configured to provide the captured data from the sensors 28 for the home mode of the security system. A notification may be transmitted from the security system to the mobile device 75 when the operating mode of the security system is changing to an away mode, a stay mode, a transition mode, or a vacation mode. The notification may be transmitted, for example, when the mobile device 75 is determined to be within the predetermined range of the security system. In some implementations, the notification may be transmitted when the security system receives at least one of an access code (e.g., a password, a PIN (personal identification number)), facial recognition data, fingerprint recognition data, or voice recognition data.

For example, when the mobile device is determined to be within the operating range of the security system (e.g., when the user is returning home with the mobile device 75), the mobile device 75 may transmit an access code (e.g., a password, a PIN, or the like), facial recognition data, fingerprint recognition data, or voice recognition data received from the user to the security system. When the transmitted access code, facial recognition data, fingerprint recognition data, or voice recognition data is verified by the security system (e.g., compared with the access code, facial recognition data, fingerprint recognition data, or voice recognition data from authorized users), the security system may change the operating mode (e.g., from away mode to home mode). When the operating mode has changed, the security system may transmit a notification to the mobile device 75 regarding the change in operating mode (e.g., from away mode to home mode) to inform the user that the provided information (e.g., the access code, facial recognition data, fingerprint recognition data, or voice recognition data, or the like) has been verified by the security system.

In some implementations, the sensor data collected by the mobile device 75 may be transmitted when the operating mode of the security system is determined to be at least one of an away mode, a stay mode, and a vacation mode. The sensor data collected by the mobile device 75 may be transmitted when the mobile device 75 is determined to be within the predetermined range of the security system. The predetermined range may be inside a building, within a predetermined perimeter surrounding a building, and/or within a predetermined geofence area.

In some implementations, the method may include receiving, by the security system, identifying information from the mobile device 75 via a communications link that may be used to register the mobile device 75 with the security system. The identification information may include one or more of, for example, a name, username, security code, an identification code, or the like. The registration of the mobile device 75 with the security system may integrate the operation of the mobile device 75 with the security system. For example, the registration of the mobile device 75 may allow the mobile device 75 to operate in the same mode as the security system, and/or to provide data capture with the sensors 28 to the controller 73 of the security system.

The security system may activate an alarm when the security system determines that the mobile device 75 has moved according to the transmitted sensor data and according to the determined operating mode. For example, if the operating mode of the mobile device 75 and/or the security system is an away mode, the security system may activate the alarm device 76 and/or transmit a notification message (e.g., to remote system 74) when the mobile device is determined to be in motion according to the data transmitted from the sensors 28 to the security system.

In some implementations, the mobile device 75 may communicate with one or more sensors of the security system. The sensor data collected by the mobile device 75 may be transmitted to the one or more sensors of the security system. That is, the security system may compare and/or verify the data collected by one or more sensors of the security system (e.g., sensors 71, 72) according to the transmitted sensor data collected by the mobile device 75. For example, the transmitted data from the sensors 28 may be used to determine and/or verify that the data captured by the sensors 71, 72 is a security event. In another example, the transmitted data from the sensors 28 may be used to determine and/or verify that the data captured by the sensors 71, 72 is not a security event, thus minimizing and/or preventing an output of an unwanted alarm and/or notification from the security system.

A security event may be determined by the security system according to the sensor data collected by the mobile device 75, data collected by one or more sensors of the security system, and the like. As discussed above, the collected data may be compared with signature data to determine whether there is a security event.

In implementations according to the disclosed subject matter, the mobile device 75 may operate in a different mode than the security system when the mobile device 75 is located outside of the predetermined range of the security system. For example, the mobile device may operate in a mode different from a home mode, a stay mode, and away mode, a vacation mode, and/or a transition mode that the security system may be operating in. That is, the mobile device 75 may operate in a normal mode (e.g., an operation mode that is separate from being integrated with the security system), rather than a security mode (e.g., a home mode, a stay mode, and away mode, a vacation mode, and/or a transition mode).

When the mobile device 75 and/or the security system determines that a security event has occurred, a notification can be transmitted accordingly. The notification may be to at least one of an emergency contact, emergency services, law enforcement, and a fire department. For example, when the security system determines that there has been an opening of a window or door from the outside when the security system is in an away mode, a notification can be transmitted to law enforcement. In another example, when the mobile device 75 is operating in an away mode, and movement is detected by the sensors 28, the mobile device and/or security system may transmit a notification to law enforcement.

In implementations of the disclosed subject matter, an indication of sound may be detected with a microphone (e.g., one or sensors 28) of the mobile device 75, and the security system may determine the occurrence of a security event according to the detected indication of sound. That is, the security system may determine whether a security event has occurred by comparing the indication of sound with signature data of a security event, and may output an alarm and/or notification it is determined that they are similar. For example, the microphone may detect a sound of breaking glass (e.g., of a window in the house and/or building), and the security system may compare the indication of the detected sound with data regarding an unlawful entry (e.g., the captured sound data may match signature data of breaking glass), and the security system may accordingly output an alarm and/or transmit a notification.

Light may be detected with a light sensor (e.g., one of sensors 28) of the mobile device 75, and data representing the detected light may be received by the security system. The security system may determine whether a security event has occurred by comparing the transmitted data with signature data of a security event, and may output an alarm and/or notification it is determined that the data are similar. For example, a change in light detected by the sensors 28 may indicate that the mobile device 75 has been moved (e.g., while the mobile device 75 is operating in an away mode), and that an alarm and/or notification may be output by the security system.

Implementations of the disclosed subject matter may also provide calibrating one or more sensors of the mobile device 75 so as to determine a signature of one or more security events, and transmitting a notification to the security system from the mobile device 75 when the one or more sensors of the mobile device 75 determines the signature of the one or more security events. That is, the sensors 28 and/or processor 24 of the mobile device 75 may calibrated and/or programmed so as to compare the captured data from the sensors with signature data of one or more security events to determine if there is a similarity. When the captured data from the sensors is similar to the signature data, a notification may be received by the security system (e.g., the controller 73 and/or the remote system 74), which may control the alarm device 76 to output an audio and/or visual alarm. In some implementations, the sensors 71, 72 and the controller 73 (and/or remote system 74) may be similarly calibrated and may store similar signature data, and the controller 73 (and/or remote system 74) may compare the captured data from the sensors 71, 72 and with the signature data, and control the alarm device 76 accordingly. The signature data may be for security events such as, for example, unauthorized movement of the mobile device, opening of a door (e.g., from the outside), opening of a window (e.g., from the outside), attempted forced entry through a door and/or window, or the like.

Various implementations of the presently disclosed subject matter may include or be embodied in the form of computer-implemented processes and apparatuses for practicing those processes. Implementations also may be in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing implementations of the disclosed subject matter. When implemented on a general-purpose microprocessor, the computer program code may configure the microprocessor to become a special-purpose device, such as by creation of specific logic circuits as specified by the instructions.

Implementations may be implemented using hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method of operating a home security system, the method comprising:
   communicatively coupling a mobile device to the home security system to integrate one or more sensors of the mobile device with the operation of the home security system when the mobile device is determined, by the home security system, to be within a home protected by the home security system;
   determining, at the home security system, an unauthorized entry to the home when the home security system is operating in an away mode or a vacation mode and when the home security system determines that the mobile device has been moved by an unauthorized person based on sensor data collected by the one or more sensors of the mobile device; and
   outputting an alarm, by an alarm device of the home security system, based on the determined unauthorized entry by the home security system.

2. The method of claim 1, wherein the determined unauthorized entry is through a door or window of the home.

3. The method of claim 1, wherein the determined unauthorized entry is when a door or window of the home is compromised.

4. The method of claim 1, wherein the sensor data is collected by the home security system when the operating mode of the home security system is determined to be at least one of the group consisting of: an away mode, a stay mode, and a vacation mode.

5. The method of claim 1, further comprising:
   receiving, by the home security system, identifying information from the mobile device to the home security system via a communications link; and
   registering the mobile device with the home security system according to the received identifying information.

6. The method of claim 1, wherein the home security system verifies the data collected by the one or more sensors of the home security system based on the sensor data from the one or more sensors of the mobile device.

7. The method of claim 1, further comprising:
   determining, at the home security system, a home security event or home safety event; and
   transmitting a notification communication from the home security system to at least one of the group consisting of: an emergency contact, emergency services, law enforcement, and a fire department when the home security event or home safety event is determined.

8. The method of claim 1, wherein in the mobile device operates in a different mode than the home security system when the mobile device is located outside of the home.

9. A home security system comprising:
- a communications interface that is communicatively coupled to a mobile device to integrate one or more sensors of the mobile device with the operation of the home security system when the mobile device is determined to be within a home protected by the home security system;
- a processor to determine an unauthorized entry to the home when the processor determines that the home security system is operating in an away mode or a vacation mode, and when the processor determines that the mobile device has been moved by an unauthorized person based on sensor data collected by the one or more sensors of the mobile device; and
- an alarm device, communicatively coupled to the processor, to output an alarm based on the determined unauthorized entry by the home security system.

10. The system of claim 9, wherein the unauthorized entry is through a door or window of the home.

11. The system of claim 9, wherein the determined unauthorized entry is when a door or window of the home is compromised.

12. The system of claim 9, wherein the sensor data is collected by the home security system when the operating mode of the home security system is determined to be at least one of the group consisting of: an away mode, a stay mode, and a vacation mode.

13. The system of claim 9, wherein the processor receives identifying information from the mobile device to the home security system via a communications link, and registers the mobile device with the home security system according to the received identifying information.

14. The system of claim 9, wherein the processor verifies the data collected by the one or more sensors of the home security system based on the sensor data from the one or more sensors of the mobile device.

15. The system of claim 9, wherein the processor determines a home security event or home safety event, and
wherein the communications interface transmits a notification communication to at least one of the group consisting of: an emergency contact, emergency services, law enforcement, and a fire department when the home security event or home safety event is determined.

16. The system of claim 9, wherein in the mobile device operates in a different mode than the home security system when the mobile device is located outside of the home.

17. The system of claim 9, wherein the one or more sensors of the mobile device or the one or more sensors of the home security system are selected from the group consisting of: a motion sensor, a microphone, a light sensor, a smoke sensor, a carbon monoxide sensor, a temperature sensor, an orientation sensor, and a camera.

* * * * *